US010920363B2

(12) United States Patent
Lee et al.

(10) Patent No.: US 10,920,363 B2
(45) Date of Patent: Feb. 16, 2021

(54) WASHING MACHINE

(71) Applicant: Samsung Electronics Co., Ltd, Suwon-si (KR)

(72) Inventors: Jin Ho Lee, Suwon-si (KR); Han Kyu Choi, Suwon-si (KR); Hwa Shik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 16/065,702

(22) PCT Filed: Dec. 7, 2016

(86) PCT No.: PCT/KR2016/014293
§ 371 (c)(1),
(2) Date: Jun. 22, 2018

(87) PCT Pub. No.: WO2017/111352
PCT Pub. Date: Jun. 29, 2017

(65) Prior Publication Data
US 2019/0003106 A1    Jan. 3, 2019

(30) Foreign Application Priority Data

Dec. 24, 2015  (KR) ........................ 10-2015-0186551

(51) Int. Cl.
*D06F 39/14* (2006.01)
(52) U.S. Cl.
CPC .................................... *D06F 39/14* (2013.01)
(58) Field of Classification Search
CPC ....................................................... D06F 39/14
(Continued)

(56) References Cited

U.S. PATENT DOCUMENTS 6,748,771 B2 *  6/2004  Nitschmann ............ D06F 37/28
                                                                68/196
7,320,186 B2 *  1/2008  Schone ................... D06F 37/28
                                                                34/139

(Continued)

FOREIGN PATENT DOCUMENTS

CL    2017003049 A1    3/2018
CL    2017003050 A1    3/2018

(Continued)

OTHER PUBLICATIONS

Supplementary European Search Report dated Aug. 31, 2018 in connection with European Patent Application No. 16 87 9219, 8 pages.

(Continued)

*Primary Examiner* — Daniel J Troy
*Assistant Examiner* — Timothy M Ayres

(57) ABSTRACT

Disclosed herein is a washing machine, which includes a cabinet having a first opening and a washing space therein and a door assembly configured to open or close the first opening. The door assembly includes a door unit including a guide duct having one side forming a second opening and the other side connected to the washing space, and configured to be rotatable with respect to the cabinet, a sub-door configured to open or close the second opening and a sealing assembly configured to seal the other side of the guide duct. With this configuration, it is possible to effectively seal the inside of the washing machine.

18 Claims, 12 Drawing Sheets

(58) Field of Classification Search
USPC .......................................................... 312/292
See application file for complete search history.

(56) References Cited

U.S. PATENT DOCUMENTS

| | | | | |
|---|---|---|---|---|
| 7,614,162 | B2* | 11/2009 | Renzo | D06F 58/04 |
| | | | | 34/603 |
| 9,340,917 | B2* | 5/2016 | Carrillo | D06F 37/266 |
| D771,336 | S* | 11/2016 | Kang | D32/25 |
| D789,629 | S* | 6/2017 | Lee | D32/25 |
| 10,301,760 | B2* | 5/2019 | Kim | D06F 39/14 |
| 10,415,174 | B2* | 9/2019 | Park | D06F 39/14 |
| 2004/0020246 | A1* | 2/2004 | Yun | D06F 37/28 |
| | | | | 68/24 |
| 2007/0125132 | A1 | 6/2007 | Hwang | |
| 2008/0028804 | A1* | 2/2008 | Hoppe | D06F 37/28 |
| | | | | 68/139 |
| 2009/0165391 | A1* | 7/2009 | Kocak | D06F 39/14 |
| | | | | 49/480.1 |
| 2015/0211167 | A1* | 7/2015 | Kim | D06F 31/00 |
| | | | | 68/140 |
| 2015/0292135 | A1 | 10/2015 | Wishney et al. | |
| 2017/0137985 | A1* | 5/2017 | Kim | D06F 37/28 |
| 2018/0135231 | A1 | 5/2018 | Park et al. | |
| 2018/0171533 | A1 | 6/2018 | Lee et al. | |
| 2018/0237971 | A1 | 8/2018 | Kim et al. | |
| 2018/0340286 | A1 | 11/2018 | Kim et al. | |

FOREIGN PATENT DOCUMENTS

| | | |
|---|---|---|
| CL | 2017003051 A1 | 3/2018 |
| CL | 2017003048 A1 | 4/2018 |
| CN | 104975476 A | 10/2015 |
| CN | 107771229 A | 3/2018 |
| EP | 1389643 A2 | 2/2004 |
| EP | 2415920 A1 | 2/2012 |
| EP | 2415920 B1 | 5/2013 |
| EP | 2930263 A1 | 10/2015 |
| EP | 3287556 A1 | 2/2018 |
| KR | 10-0447664 B1 | 9/2004 |
| KR | 10-2007-0002336 A | 1/2007 |
| KR | 10-2007-002336 A | 1/2007 |
| KR | 10-2009-0096948 A | 9/2009 |
| KR | 10-2015-0118230 A | 10/2015 |

OTHER PUBLICATIONS

Office Action dated Jul. 23, 2018 in connection with Australian Patent Application No. 2016376419, 3 pages.
Notice of acceptance for patent application dated Oct. 30, 2018 in connection with Australian Patent Application No. 2016376419, 3 pages.
European Patent Office, "Communication under Rule 71(3) EPC," Application No. EP 16879219.0, dated May 17, 2019, 46 pages.
Instituto Nacional de Propiedad Industrial INAPI—Chile,"Examiner's Report," Application No. CL201800984, dated Jun. 13, 2019, 20 pages.
Office Action dated Mar. 20, 2020 in connection with India Patent Application No. 201817027521, 6 pages.
Office Action dated Dec. 2, 2019 in connection with Chinese Patent Application No. 201680075945.7, 16 pages.
Office Action dated Nov. 13, 2019 in connection with Chile Patent Application No. 201800984, 22 pages.
International Search Report dated Feb. 28, 2017 in connection with International Patent Application No. PCT/KR2016/014293.
Written Opinion of the International Searching Authority dated Feb. 28, 2017 in connection with International Patent Application No. PCT/KR2016/014293.
Office Action dated Jul. 15, 2020 in connection with Chinese Patent Application No. 201680075945.7, 8 pages.

* cited by examiner

[Fig. 1]
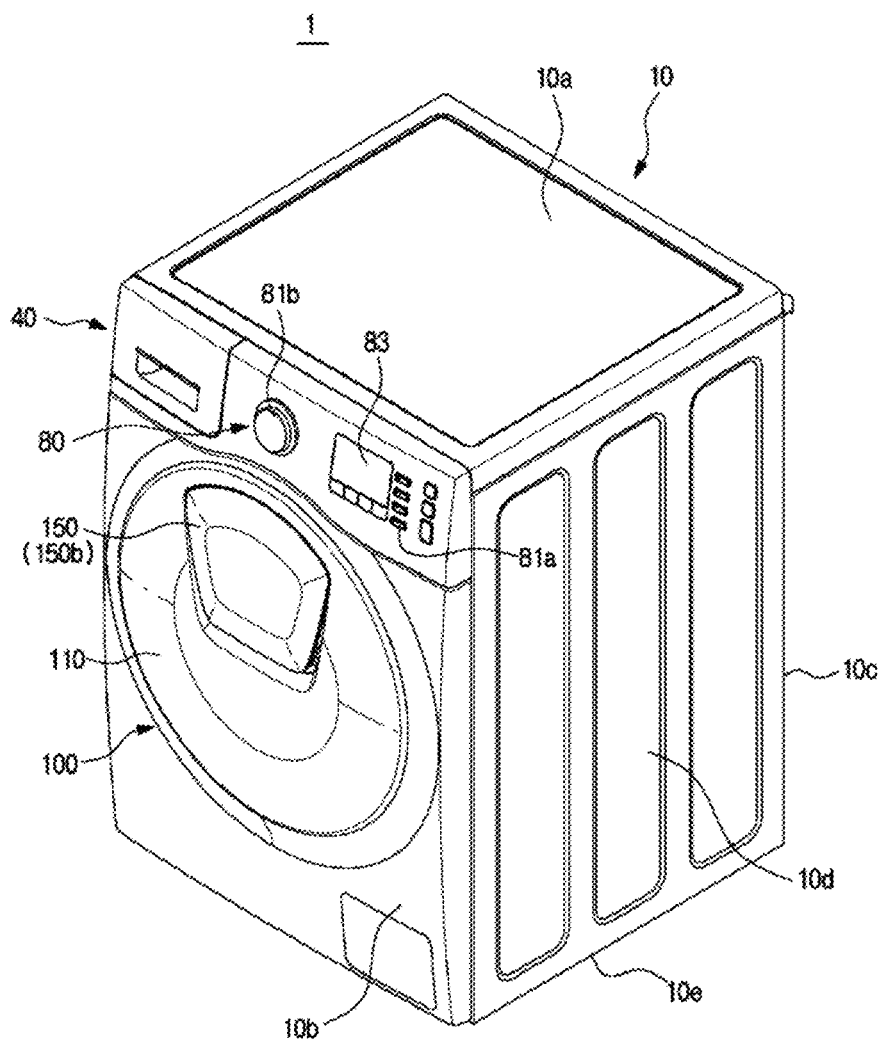

[Fig. 2]
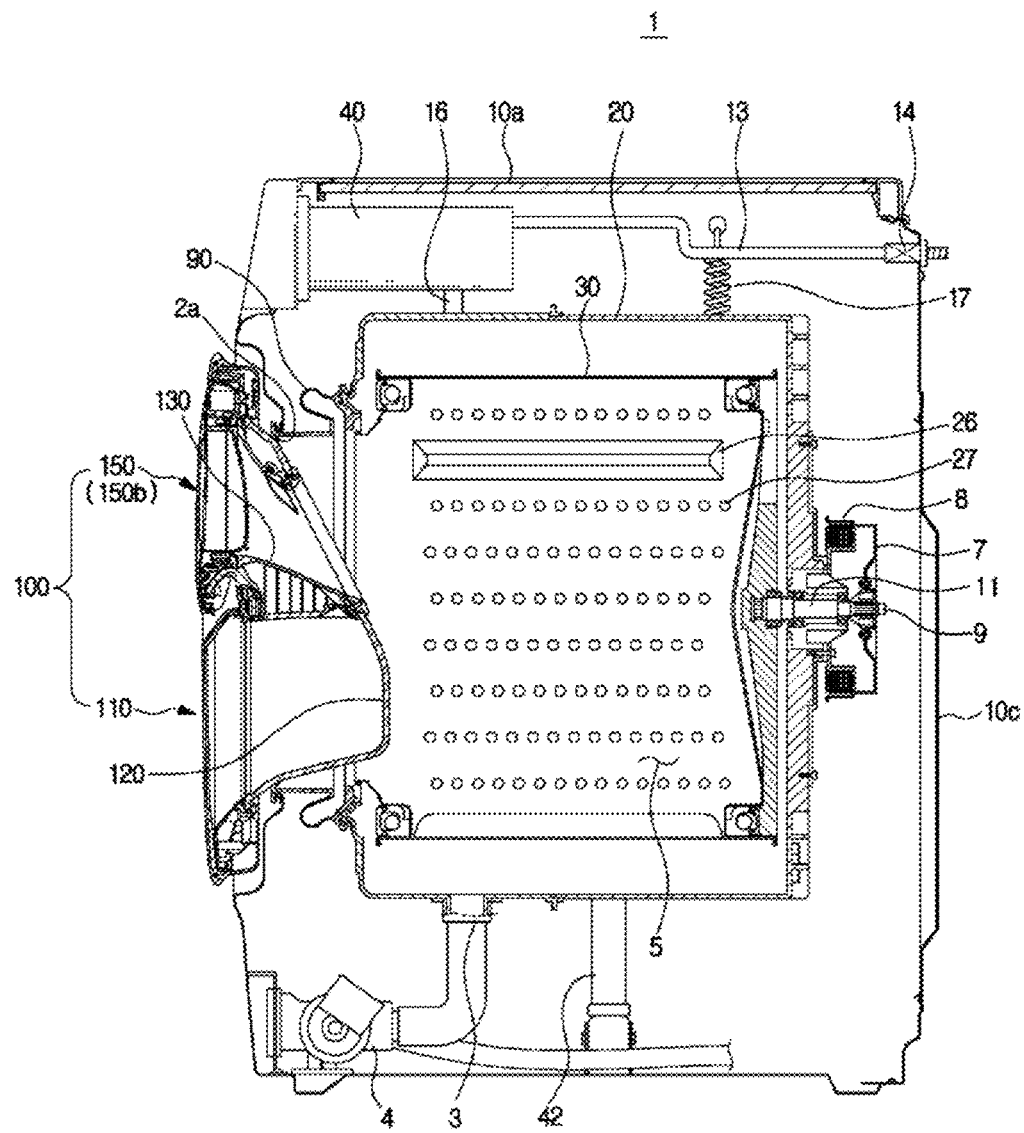

[Fig. 3]
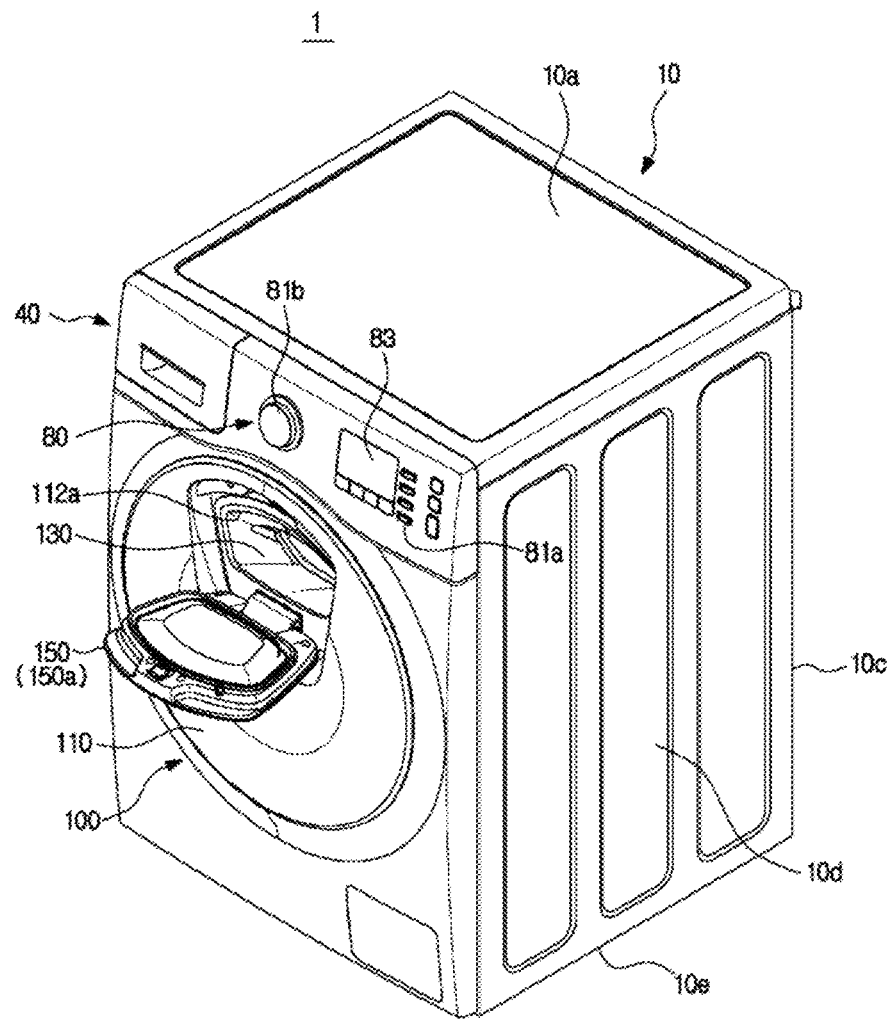

[Fig. 4]
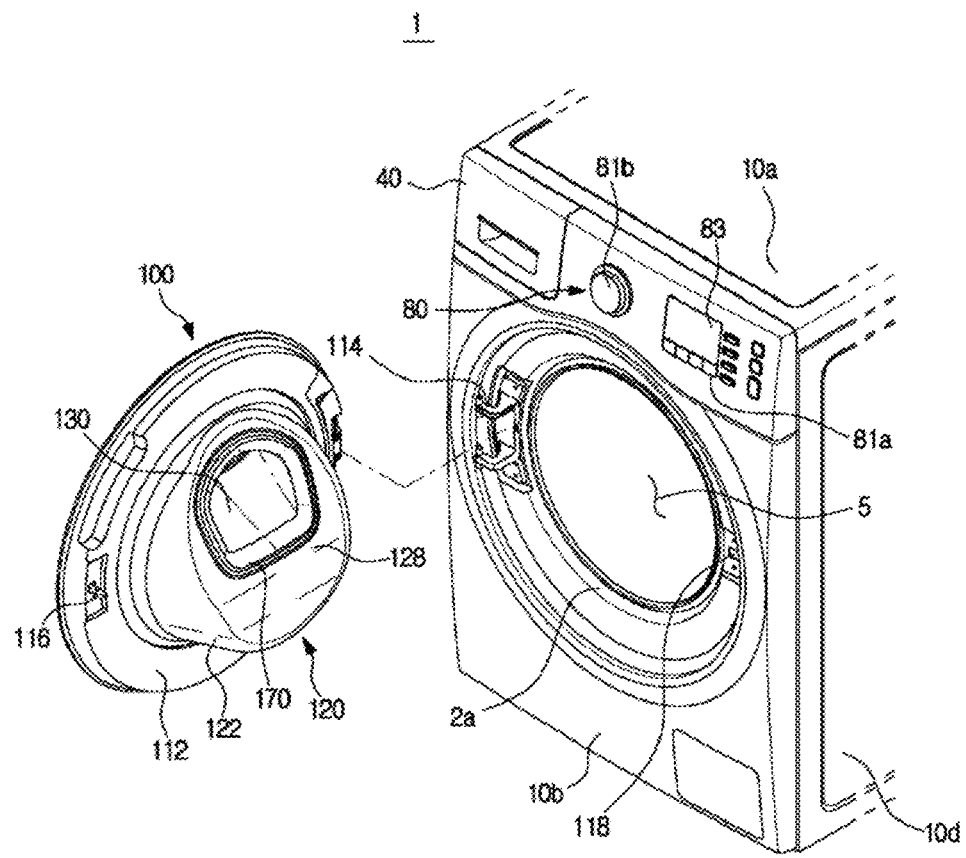
[Fig. 5]
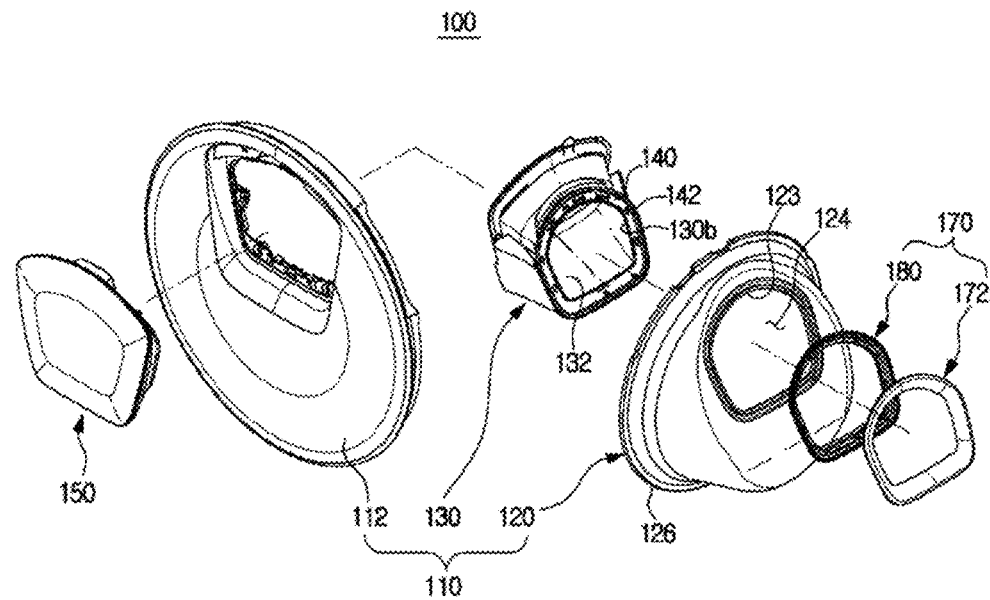

[Fig. 6]
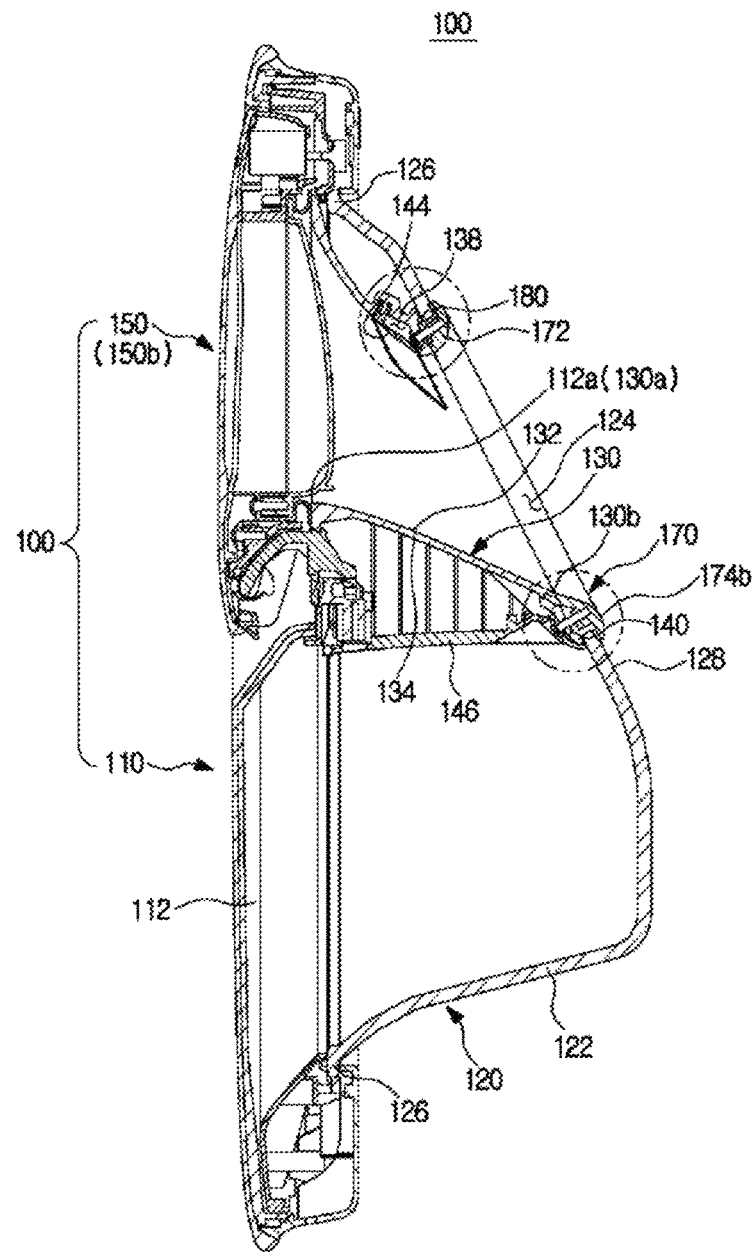

[Fig. 7]
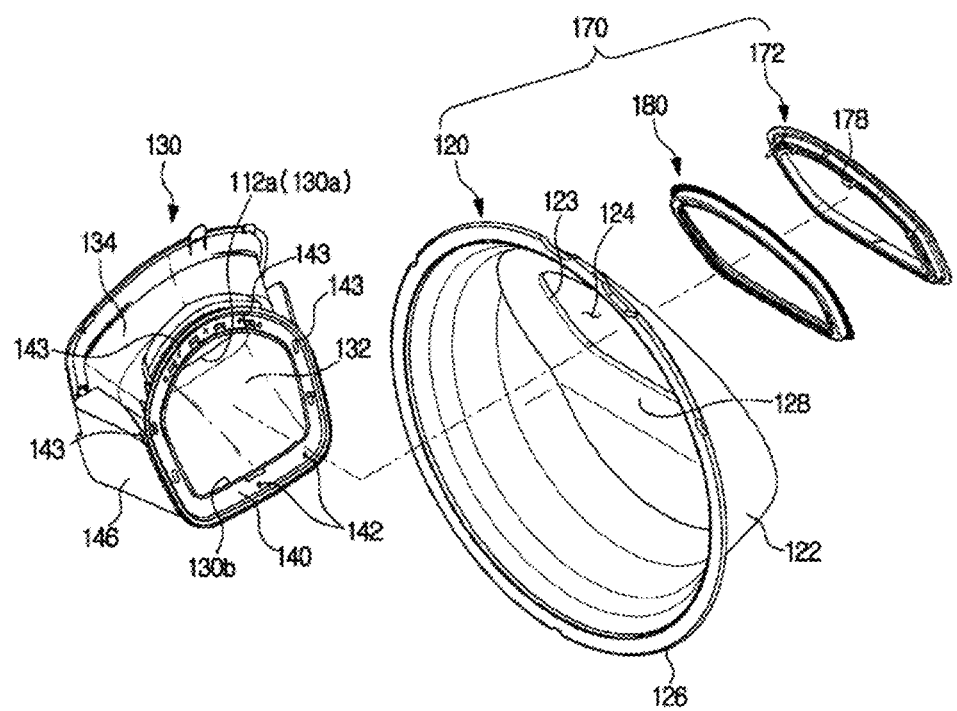
[Fig. 8]
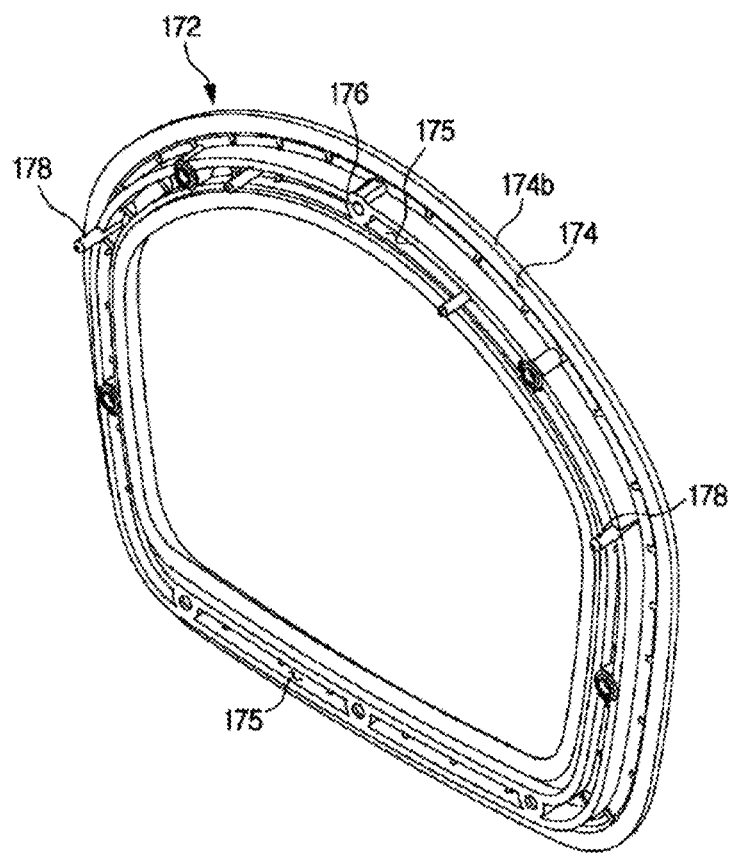

[Fig. 9]
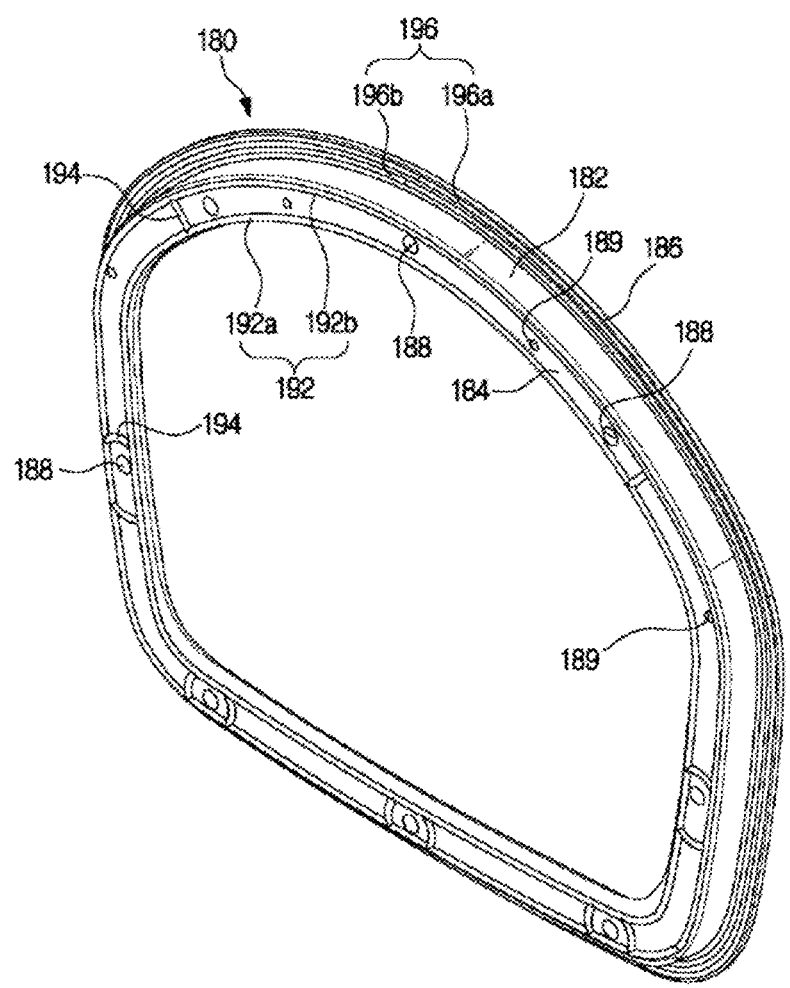

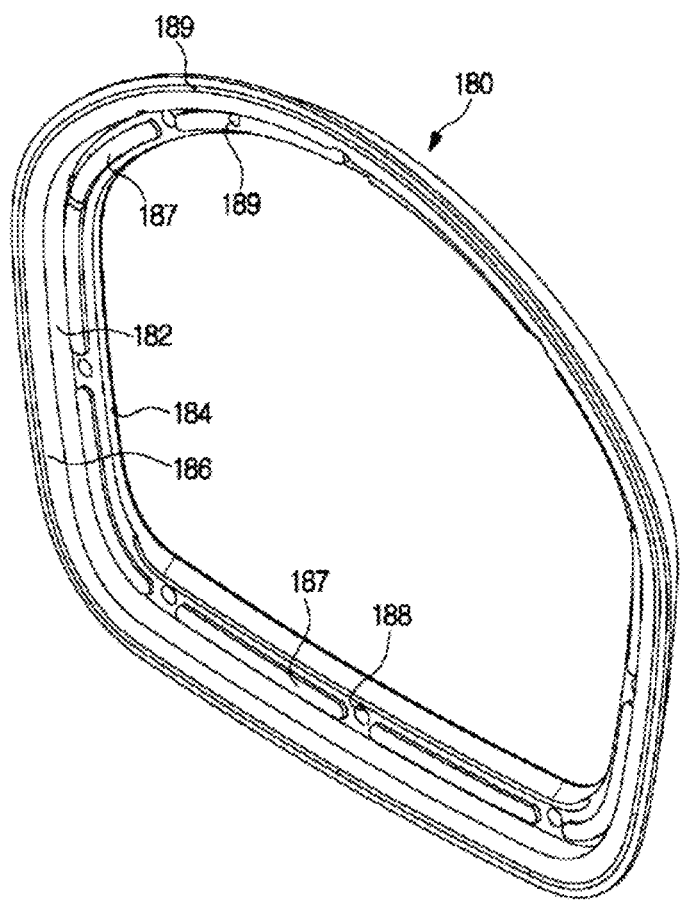
[Fig. 10]

[Fig. 11]
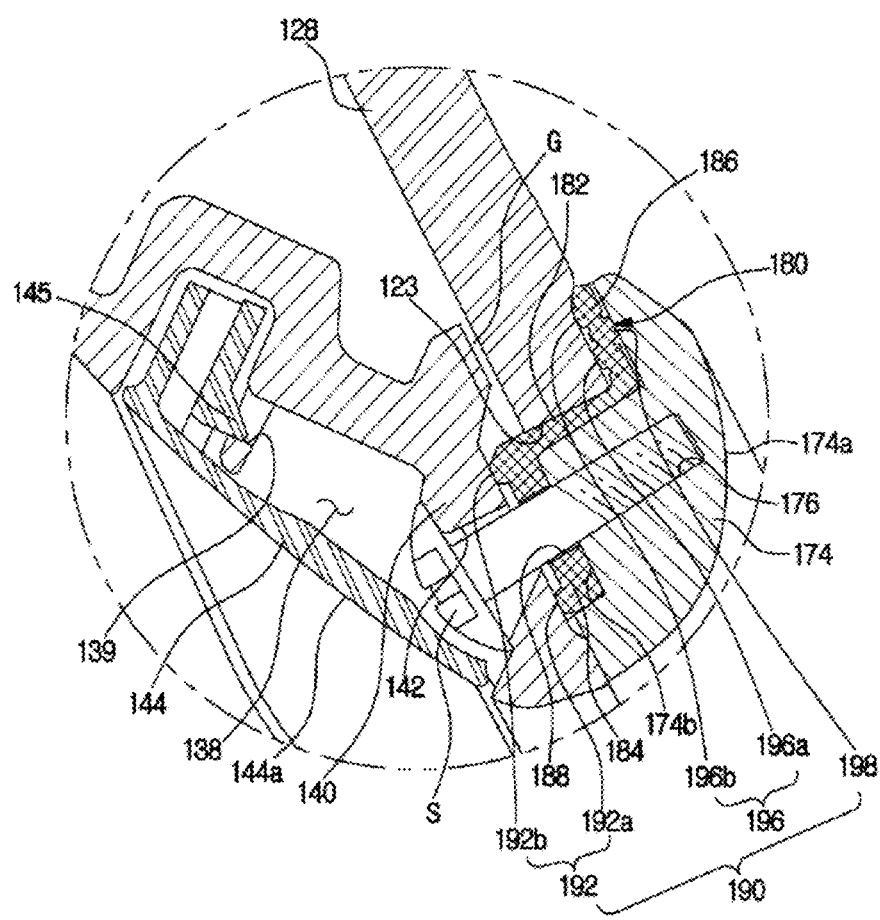

[Fig. 12]
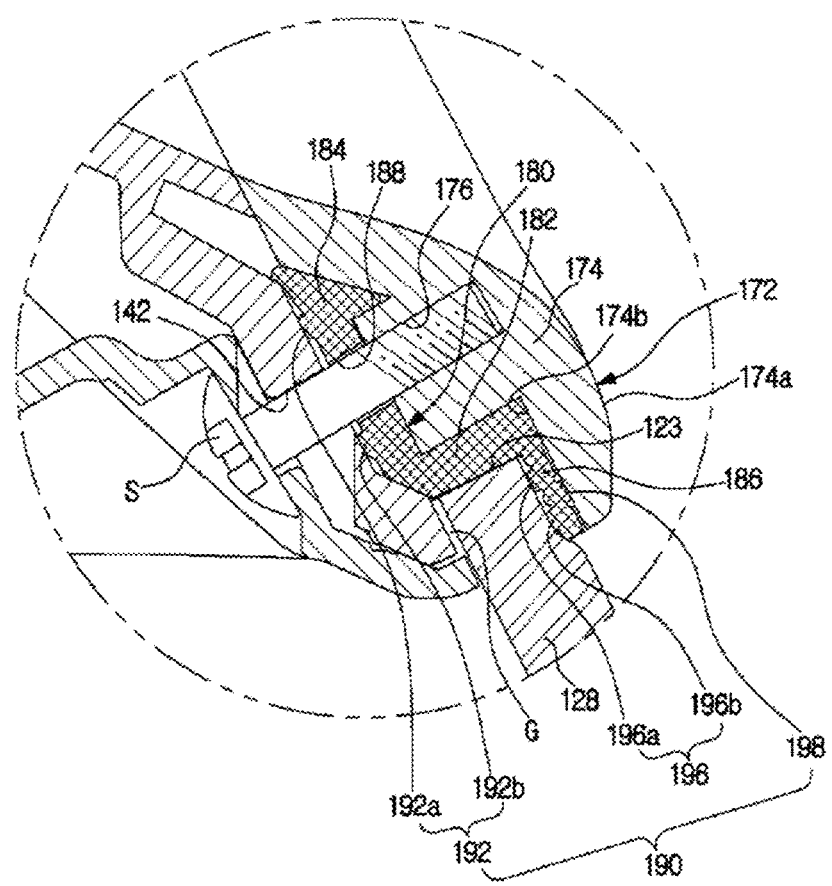

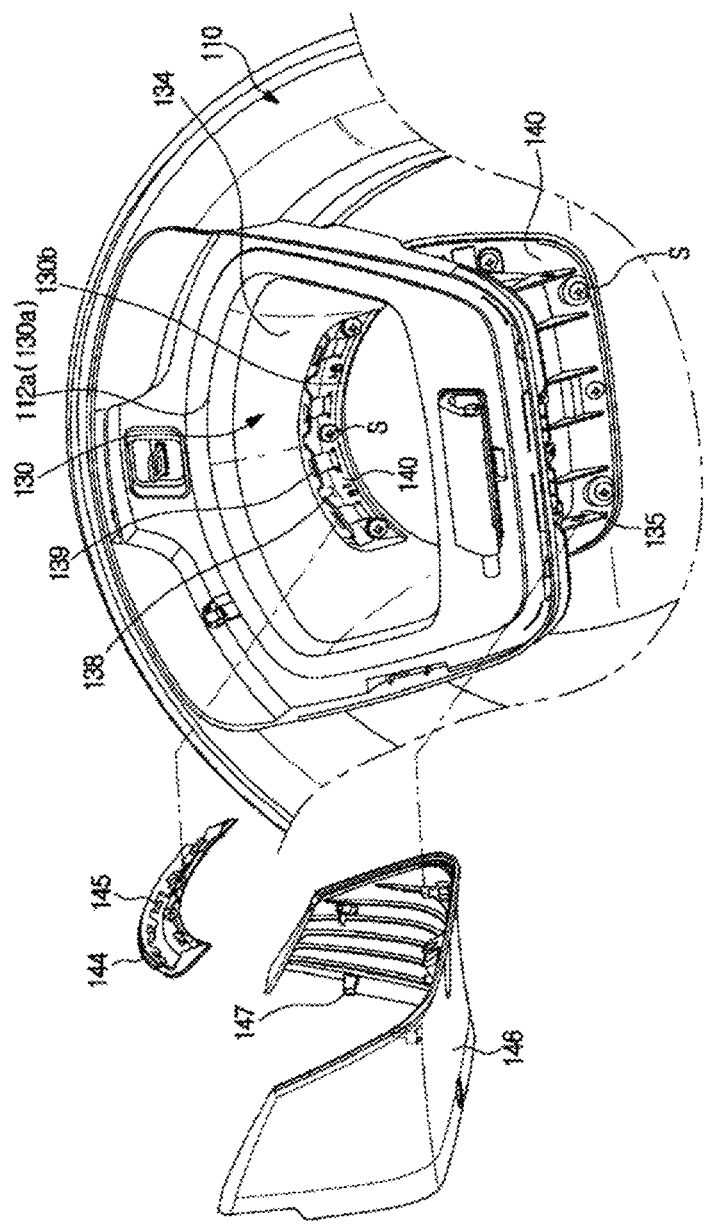
[Fig. 13]

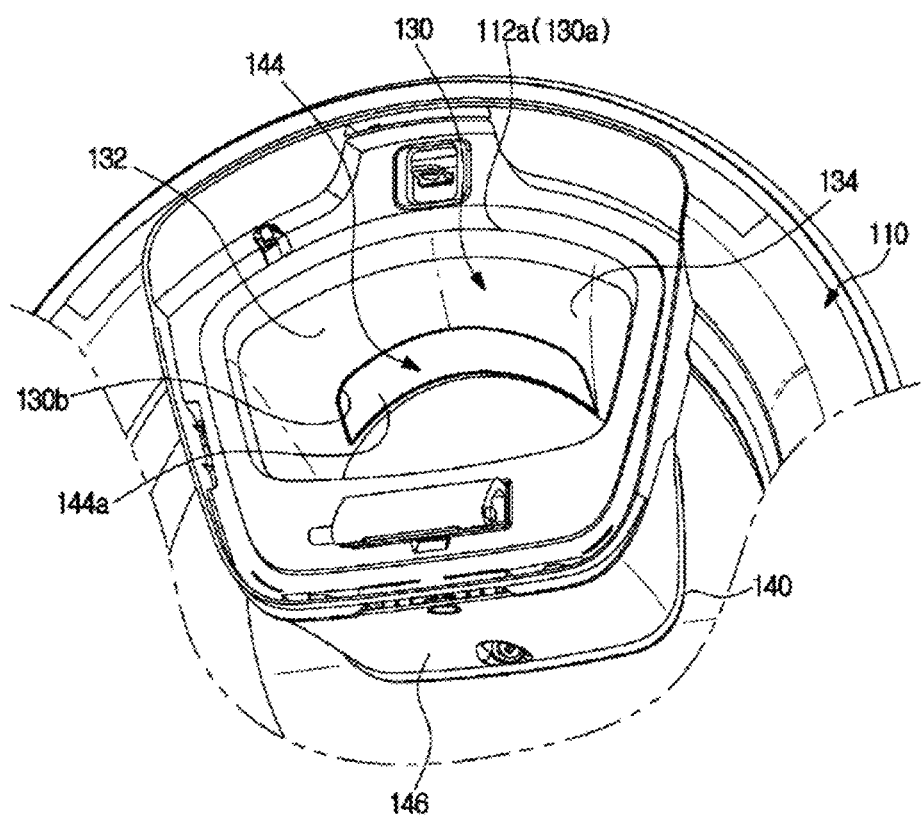
[Fig. 14]

WASHING MACHINE

CROSS-REFERENCE TO RELATED APPLICATION(S) AND CLAIM OF PRIORITY

This application is a 371 of International Application No. PCT/KR2016/014293 filed Dec. 7, 2016, which claims priority to Korean Patent Application No. 10-2015-0186551 filed Dec. 24, 2015, the disclosures of which are herein incorporated by reference in their entirety.

TECHNICAL FIELD

Embodiments of the present disclosure relate to a washing machine, and more particularly, to a washing machine having an input structure improved to easily receive laundry and to increase sealing efficiency.

BACKGROUND

Generally, washing machines are machines configured to wash clothes using an electric power, and the washing machines are classified into drum type washing machines and vertical axis type washing machines. In the drum type washing machine, a rotating tub is disposed in a horizontal direction, and the rotating tub rotates in forward and backward directions with respect to a horizontal axis thereof, and thus, laundry is washed by being risen and fallen. In the vertical axis type washing machine, a rotating tub including a pulsator therein is vertically disposed, and the rotating tub rotates in forward and backward directions with respect to a vertical axis thereof, and thus, laundry is washed by a water flow generated by the pulsator.

Generally, a drum type washing machine includes a cabinet, a tub configured to store water, and a drum configured to receive laundry and rotatably installed inside the tub. An opening is formed in the cabinet, and the opening is configured to be opened or closed by a door.

When laundry, detergent, and wash water are input into the drum, the drum rotates, and the laundry is stirred with the wash water, and thus, dirt on the laundry is removed.

In the above process, the laundry is input through the opening provided in the cabinet, and the detergent and the wash water are supplied by a detergent supplier.

Further, when a washing cycle starts in the drum type washing machine, the door of the drum type washing machine maintains a locking state. Thus, in order to open the door during the washing cycle, a user should wait until the completion of the washing cycle, or should stop the washing cycle and wait until drainage of the wash water is completed. Therefore, a provision of additional laundry or detergent during the washing cycle is limited.

SUMMARY

The present disclosure is directed to providing a washing machine having an input structure for laundry or detergent improved to freely receive the laundry and the detergent.

Further, the present disclosure is directed to providing a washing machine having an input structure improved to freely receive laundry and detergent during a washing cycle.

Furthermore, the present disclosure is directed to providing a washing machine having a sealing structure.

In accordance with one aspect of the present invention, a washing machine includes a cabinet having a first opening and a washing space therein and a door assembly configured to open or close the first opening. The door assembly includes a door unit including a guide duct having one side forming a second opening and the other side connected to the washing space, and configured to be rotatable with respect to the cabinet, a sub-door configured to open or close the second opening and a sealing assembly configured to seal the other side of the guide duct.

The door unit may include a door body corresponding to the first opening and a door glass including a glass opening corresponding to the other side of the guide duct, and combined with the door body and the sealing assembly is configured to seal between the other side of the guide duct and the glass opening.

The guide duct may include a duct connecting portion formed on the other side of the guide duct in a flange shape and the door glass is disposed adjacent to the glass opening and formed to correspond to the duct connecting portion.

At least one portion of each of the glass connecting portion and the duct connecting portion may be formed in a planar shape.

The glass connecting portion may face and be parallel to the duct connecting portion.

The sealing assembly may include a sealing rubber having elasticity and configured to cover a gap formed between the guide duct and the glass opening and a sealing cap configured to cover the sealing rubber and provided to be combined with at least one of the guide duct and the door glass.

The sealing cap may be configured to press the sealing rubber toward the gap.

The sealing cap may include one side surface exposed to the washing space and the other side surface configured to cover the gap with the sealing rubber.

The guide duct may include a duct connecting portion formed on the other side of the guide duct in a flange shape and corresponding to the door glass and the sealing cap and the sealing rubber include one sides combined with the duct connecting portion and the other sides configured to cover a portion of the door glass adjacent to the duct connecting portion.

One of the sealing cap and the sealing rubber may have at least one fixing groove formed in a longitudinal direction thereof and the other of the sealing cap and the sealing rubber have at least one fixing protrusion configured to be inserted into and provisionally combined with the fixing groove.

The sealing cap and the sealing rubber may be provided in a ring shape.

The guide duct may include a duct connecting portion formed on the other side of the guide duct in a flange shape. The door glass may include a glass connecting portion provided adjacent to the glass opening and corresponding to the duct connecting portion. The sealing rubber may include a rubber body, a first sealing rubber extending from the rubber body toward a space between the duct connecting portion and the sealing cap and a second sealing rubber extending from the rubber body toward a space between the glass connecting portion and the sealing cap.

The first and second sealing rubbers may be configured to be mutually stepped with the rubber body interposed therebetween.

The sealing rubber may include at least one rib protrusion formed on at least one sealing portion of the first and second sealing portions in a longitudinal direction of the sealing rubber and configured to face the duct connecting portion or the glass connecting portion.

The rib protrusion may be formed in a closed loop shape in the longitudinal direction of the sealing rubber.

The at least one rib protrusion may include: a first duct rib protrusion formed along the first sealing portion; and a second duct rib protrusion disposed radially outward from the first duct rib protrusion by a predetermined interval.

Both of the sealing cap and the sealing rubber may be screw-coupled to the duct connecting portion, and the at least one rib protrusion may include a connecting rib protrusion that is spaced apart from a portion, at which the screw-coupling is made, and is configured to connect the first and second duct rib protrusions to each other.

The at least one rib protrusion may include: a first unit rib protrusion formed along the second sealing portion; and a second unit rib protrusion disposed radially outward from the first unit rib protrusion by a predetermined interval, and the sealing rubber may include an auxiliary rib protrusion alternately disposed with the first and second unit rib protrusions with respect to the second sealing portion while facing the sealing cap.

The sealing cap may include: a cap body and at least one assembling protrusion protruding from the cap body toward the guide duct and passing through both a connecting hole having a shape of a hole formed in the guide duct and a rubber hole having a shape of a hole formed in the sealing rubber.

The guide duct may include: an assembly connecting portion adjacent to the duct connecting portion and concave with respect to an inner surface of the guide duct, and may allow a rear surface of the duct connecting portion to be exposed; and a cover configured to cover the assembly connecting portion, wherein the cover may have a cover surface extending from the inner surface of the guide duct.

The guide duct may tilt downward from the one side to the other side.

In accordance with another aspect of the present invention, a washing machine includes: a cabinet having a first opening and forming a washing space therein; and a door assembly configured to open or close the first opening. The door assembly includes: a door body configured to be rotatable with respect to the cabinet; a guide duct coupled to the door body, forming a second opening at one side thereof, and communicating the second opening with the washing space; a sub-door configured to open or close the second opening; and a sealing assembly configured to seal between the guide duct and a door glass.

The door glass may include a glass opening corresponding to the other side of the guide duct, and the sealing assembly may be configured to seal between the other side of the guide duct and the glass opening.

The sealing assembly may have elasticity, and may include: a sealing rubber configured to cover a gap formed between the guide duct and the glass opening; and a sealing cap configured to press the sealing rubber toward the gap and coupled to at least one of the guide duct and the door glass.

The sealing rubber may include a rubber body; a first sealing rubber extending from the rubber body toward a space between a duct connecting portion and the sealing cap; and a second sealing rubber extending from the rubber body toward a space between a glass connecting portion and the sealing cap.

The sealing rubber may be provided on at least one of first and second sealing portions, and may include at least one rib protrusion formed in a longitudinal direction of the sealing rubber.

The sealing cap may include a cap body; and at least one assembling protrusion protruding from the cap body toward the guide duct and passing through both a connecting hole having a shape of a hole formed in the guide duct and a rubber hole having a shape of a hole formed in the sealing rubber.

A user can open a sub-door at an arbitrary time to freely input laundry or detergent during a washing cycle.

In addition, a method of inputting laundry or supplying detergent can be diversified.

Further, laundry or detergent can be additionally input during operation of a washing machine.

Furthermore, a sealing structure of a door is improved, and an inside of the cabinet may be more effectively sealed.

BRIEF DESCRIPTION OF THE DRAWINGS

FIG. 1 is a perspective view illustrating a washing machine in accordance with one embodiment of the present disclosure.

FIG. 2 is a cross-sectional view illustrating the washing machine in accordance with one embodiment of the present disclosure.

FIG. 3 is a view illustrating a state in which a sub-door of the washing machine in accordance with one embodiment of the present disclosure is open.

FIG. 4 is a view illustrating a door assembly of the washing machine in accordance with one embodiment of the present disclosure.

FIG. 5 is an exploded perspective view illustrating the door assembly in accordance with one embodiment of the present disclosure.

FIG. 6 is a cross-sectional view illustrating the door assembly in accordance with one embodiment of the present disclosure.

FIG. 7 is an exploded perspective view illustrating a portion of the door assembly in accordance with one embodiment of the present disclosure.

FIG. 8 is a perspective view illustrating a sealing cap in accordance with one embodiment of the present disclosure.

FIGS. 9 and 10 are perspective views illustrating a sealing rubber in accordance with one embodiment of the present disclosure.

FIG. 11 is an enlarged view illustrating portion A shown in FIG. 6.

FIG. 12 is an enlarged view illustrating portion B shown in FIG. 6.

FIGS. 13 and 14 are views illustrating a coupling of duct covers in the door assembly in accordance with the embodiment of the present disclosure.

DETAILED DESCRIPTION

Embodiments described in the present specification and structures described in drawings are only preferable examples of the disclosed present disclosure, and at the time of the application of the present disclosure, the present disclosure is susceptible to various modifications and alternative forms which may substitute for the embodiments and drawings of the present specification.

Also, in numbering reference numerals to the structural parts of each drawing, like numerals may refer to like elements throughout the description of the figures although the reference numerals are displayed in different drawings.

Also, terms used in the present disclosure are only used to describe particular embodiments, and it is not intended to limit the present disclosure. As used herein, the singular forms "a," "an," and "the" are intended to include the plural forms as well, unless the context clearly indicates otherwise. It will be further understood that the terms "comprises"

and/or "comprising," when used in this specification, specify the presence of stated features, integers, steps, operations, elements, and/or components, but do not preclude the presence or addition of one or more other features, integers, steps, operations, elements, components, and/or groups thereof.

Also, in the present disclosure, the terms "first," "second," etc. are used to distinguish one element from another. It will be understood that, although the terms first, second, etc. may be used herein to describe various elements, the elements should not be limited by the terms. The terms are used to distinguish one element from another. For example, a first element discussed below could be termed a second element without departing from the teachings of the present disclosure. Also, a second element discussed below could be termed a first element without departing from the teachings of the present disclosure. As used herein, the singular forms are intended to include the plural forms as well, unless the context clearly indicates otherwise.

Hereinafter, embodiments of the present disclosure will be described in detail with reference to the accompanying drawings.

FIG. 1 is a perspective view illustrating a washing machine in accordance with one embodiment of the present disclosure, FIG. 2 is a cross-sectional view illustrating the washing machine in accordance with one embodiment of the present disclosure, and FIG. 3 is a view illustrating a state in which a sub-door of the washing machine in accordance with one embodiment of the present disclosure is open.

The washing machine 1 includes a cabinet 10 forming a washing space 5, a tub 20 configured to receive wash water or rinse water to be used in a wash cycle or a rinse cycle, and a driving motor 7 configured to rotate a drum 30. The washing space 5 in the cabinet 10 may be formed by the tub 20 and the drum 30.

A control panel 80 is provided on the cabinet 10, and the control panel 80 includes an input parts 81a and 81b configured to receive an input command of the washing machine 1 from a user and a display part 83 configured to display operation information of the washing machine 1.

The input parts 81a and 81b receive the input command of the user, which is related to operations of the washing machine 1 such as a wash time, the number of rinsing, a rinse time, a dry time, operation, pause, etc., and may include a push button 81a or a rotary button 81b. Also, the display part 83 displays information related to operations of the washing machine 1 such as an amount of the wash water, a current cycle performed by the washing machine 1, a remaining time from completion, etc. The display part 83 may include a liquid crystal display (LCD) panel, a light emitting diode (LED) panel, etc.

The washing machine 1 in accordance with the embodiment of the present disclosure has the separate input parts 81a and 81b and the display part 83, but is not limited thereto, and may include a touch screen panel (TSP), and thus, the input parts are integrally formed with the display part.

Also, the cabinet 10 includes frames 10a, 10b, 10c, 10d, and 10e, and the frames 10a, 10b, 10c, 10d, and 10e are composed of an upper frame 10a forming an upper surface of the cabinet 10, a front frame 10b forming a front surface of the cabinet 10, a rear frame 10c forming a rear surface of the cabinet 10, and side and lower frames 10d and 10e configured to connect the front frame 10b to the rear frame 10c, respectively forming a side surface and a lower surface of the cabinet 10.

A first opening 2a is formed through the front frame 10b of the cabinet 10, and laundry may be placed inside the drum 30 through the first opening 2a. The first opening 2a may be opened or closed by a door assembly 100 installed on the front frame 10b of the cabinet 10.

A diaphragm 90 may connect the cabinet 10 to the tub 20. Specifically, the diaphragm 90 may be disposed between the first opening 2a of the cabinet 10 and the opening of the tub 20 corresponding to the first opening 2a. The diaphragm 90 may form a path from the first opening 2a of the cabinet 10 to the opening of the tub 20, and may decrease vibrations caused by rotation of the drum 30 and transmitted toward the front frame 10b. Also, a portion of the diaphragm 90 may be disposed between the door assembly 100 and the front frame 10b to prevent leakage of the wash water of the tub 20 to the outside of the cabinet 10.

The diaphragm 90 may be formed of an injection mold including a thermoplastic elastomer. Since the thermoplastic elastomer has elasticity like rubber at room temperature, the diaphragm 90 formed of the thermoplastic elastomer may effectively decrease vibrations transmitted to the front frame of the cabinet 10 in the tub 20.

A spring 17 may be provided between the tub 20 and the cabinet 10 to support the tub 20 from an upper portion thereof. Thus, the spring 17 may relieve vibrations and noise generated by agitation of the tub 20, which is caused by elasticity thereof.

A water supply pipe 13 configured to supply wash water to the tub 20 is formed on the tub 20. A water supply valve 14 is installed on one side of the water supply pipe 13.

The detergent supplier 40 is connected to the tub 20 through a connection pipe 16. The water supplied through the water supply pipe 13 is supplied to the inside of the tub 20 with detergent through the detergent supplier 40.

The tub 20 is supported by a damper 42. The damper 42 connects an inner bottom surface of the cabinet 10 to an outer surface of the tub 20. Also, the damper 42 is disposed on an inner bottom surface of the cabinet 10, as well as an upper, left, and right sides, and thus, the tub 20 may be supported. The damper 42 or the spring 17 may relieve vibrations and shock resulting from up and down movements generated from the top and bottom of the tub 20.

The tub 20 may be supported by at least one damper 42.

A driving axis 11 configured to transmit power of the driving motor 7 is connected to the rear surface of the drum 30. A plurality of throughholes 27 configured to flow wash water are formed around the drum 30. A plurality of lifters 26 are formed on an inner surface of the drum 30 to allow laundry to rise and fall when the drum 30 rotates.

The driving axis 11 is disposed between the drum 30 and the driving motor 7. One end of the driving axis 11 is connected to a rear plate of the drum 30, and the other end of the driving axis 11 extends to an outside of a rear wall of the tub 20. When the driving motor 7 drives the driving axis 11, the drum 30 connected to the driving axis 11 rotates around the driving axis 11.

A bearing housing 8 is installed on the rear wall of the tub 20 to rotatably support the driving axis 11. The bearing housing 8 may be formed of an aluminum alloy, and may be inserted into the rear wall of the tub 20 when the tub 20 is formed through injection molding. Bearings 9 are installed between the bearing housing 8 and the driving axis 11 to smoothly rotate the driving axis 11.

A drain pump 4 configured to drain water in the tub 20 to the outside of the cabinet 10, a connecting hose 3 configured to connect the tub 20 to the drain pump 4 to guide the water in the tub 20 toward the drain pump 4, and a drain hose (not shown) configured to guide the water pumped by the drain pump 4 toward the outside of the cabinet 10, are formed under the tub 20.

The washing machine 1 may further include a separate sub-door configured to freely open or close during a wash cycle in addition to having a door.

FIG. 4 is a view illustrating a door assembly of the washing machine in accordance with one embodiment of the present disclosure, FIG. 5 is an exploded perspective view illustrating the door assembly in accordance with one embodiment of the present disclosure, and FIG. 6 is a cross-sectional view illustrating the door assembly in accordance with one embodiment of the present disclosure.

The door assembly 100 is configured to open or close the first opening 2a.

The door assembly 100 may include a door unit 110 corresponding to the first opening 2a and a sub-door 150 configured to be rotatable with respect to the door unit 110.

The door unit 110 may be rotatable with respect to the cabinet 10. The door unit 110 may include a door body 112 and a door glass 120.

The door body 112 may be configured to form a frame of the door unit 110. That is, the door body 112 may correspond to the first opening 2a, and the door body 112 is configured to rotate with respect to the cabinet 10, and thus, the door assembly 100 may open or close the first opening 2a. Thus, the door body 112 corresponds to a shape of the first opening 2a, and in the embodiment of the present disclosure, the first opening 2a is formed to have a substantially circular shape, and thus, the door body 112 may be formed to have a circular shape or a ring shape.

The door unit 110 may include a second opening 112a. The second opening 112a may be formed in the door body 112. However, the second opening 112a is not limited thereto but may be formed in the door glass 120. The second opening 112a may be individually closed or opened independently of the first opening 2a by the sub-door 150, which will be described below. Although the first opening 2a is closed by the door assembly 100, the second opening 112a may be opened, and detergent or laundry may be additionally placed inside the washing machine 1. That is, the second opening 112a is configured to be connected to the inside of the cabinet 10 or the inside of the drum 30.

The door unit 110 may include a door glass 120.

The door glass 120 may be formed of a transparent material, and thus, the inside of the drum 30 may be viewed from the outside of the washing machine 1, even when the door assembly 100 is in a closing position 150b. The door glass 120 may protrude in a convex shape from the door body 112. By the above-described structure, when the door assembly 100 is in the closing position 150b, the door glass 120 may be inserted into the cabinet 10 to be further inside than the first opening 2a.

The door assembly 100 may include a door rotation part 114 and a door locker 116.

The door rotation part 114 is configured to rotate the door body 112 with respect to the cabinet 10. The door rotation part 114 is combined with one side of the door body 112, and thus, the door body 112 rotates with respect to the cabinet 10 to open or close the first opening 2a.

The door locker 116 is combined with the other side of the door body 112, and maintains a closed state when the door body 112 closes the first opening 2a. An insertion part 118 corresponding to the door locker 116 is provided on the cabinet 10, and is configured to receive the door locker 116 when the door body 112 closes the first opening 2a.

The sub-door 150 may be configured to open or close the second opening 112a. The sub-door 150 is configured to be rotatable with respect to the door body 112, and is configured to open or close the second opening 112a.

The sub-door 150 is configured to move between an opening position 150a (shown in FIG. 3) and the closing position 150b (shown in FIG. 1). The sub-door 150 opens the second opening 112a in the opening position 150a (shown in FIG. 3), and closes the second opening 112a at the closing position 150b (shown in FIG. 1).

The sub-door 150 is formed to have a width greater than or equal to that of the second opening 112a, and the second opening 112a is securely closed when the sub-door 150 closes the second opening 112a.

The inside of the drum 30 may be viewed through the door glass 120, even when the first opening 2a is closed by the door assembly 100. The door glass 120 may include a glass body 122 backwardly protruding in a convex shape from the door body 112. The glass body 122 is formed of a glass material having at least one transparent portion, and the inside of the cabinet 10 may be viewed through the glass body 122. However, the materials of the glass body 122 and the door glass 120 may not be limited to the above-described materials. For example, the door glass 120 may include at least one transparent portion, through which the inside of the cabinet 10 is viewed from the outside of the cabinet 10.

The door glass 120 may include a glass hole 124 and a glass opening 123 configured to form the glass hole 124. The glass hole 124 is configured to be connected to the washing space 5 inside of the cabinet 10. Thus, detergent or laundry input through the second opening 112a may be placed inside of the cabinet 10 through the glass hole 124. The glass hole 124 may have various shapes. The second opening 112a is formed on one side 130a of the guide duct 130, and the glass hole 124 and the glass opening 123 correspond to the other side 130b of a guide duct 130.

The door glass 120 may further include a glass flange 126 disposed on an end portion of the glass body 122 in a flange shape, and thus, the door glass 120 may be fitted into or coupled to the door body 112. The glass flange 126 is fitted into or coupled to the door body 112, and the door glass 120 may not be separated from the door body 112.

The door unit 110 may include the guide duct 130. Both sides of the guide duct 130 are open, and the guide duct 130 may have a tube shape having a hollow. Specifically, the one side 130a of the guide duct 130 forms the second opening 112a, and the other side 130b may be connected to the glass hole 124. The other side 130b of the guide duct 130 may be connected to the washing space. The sub-door 150 may seal the one side 130a of the guide duct 130.

Since the guide duct 130 is configured to have the tube shape, detergent or laundry input from the one side 130a of the guide duct 130 through the second opening 112a may pass through the duct body 134 of the guide duct 130, and may be placed inside the drum through the glass hole 124 at the other side of the guide duct 130.

The guide duct 130 may include a duct inner surface 132. The duct inner surface 132 forms an inner surface of the guide duct 130. The duct inner surface 132 is configured to guide the laundry or the detergent input through the second opening 112a into the inside of the drum through the glass hole 124.

The duct inner surface 132 may have various shapes, and may tilt downward from a front portion toward a rear portion thereof in accordance with the embodiment of the present disclosure. That is, the one side 130a of the guide duct 130 forming the second opening 112a may be higher than the other side 130b of the guide duct 130. By the above-described structure, the laundry or the detergent input through the second opening 112a may be easily input into the drum.

FIG. 7 is an exploded perspective view illustrating a portion of the door assembly in accordance with one embodiment of the present disclosure, FIG. 8 is a perspective view illustrating a sealing cap in accordance with one embodiment of the present disclosure, FIGS. 9 and 10 are perspective views illustrating a sealing rubber in accordance with one embodiment of the present disclosure, FIG. 11 is an enlarged view illustrating portion A shown in FIG. 6, and FIG. 12 is an enlarged view illustrating portion B shown in FIG. 6.

The door assembly 100 may include a sealing assembly 170.

The sealing assembly 170 is configured to seal a structure of the door assembly 100 exposed toward the washing space 5. The sealing assembly 170 is configured to seal the other side 130b of the guide duct 130. Specifically, the sealing assembly 170 is configured to seal the other side 130b of the guide duct 130 and the glass opening 123 of the door unit 110.

The door glass 120 may include a glass connecting portion 128 disposed adjacent to the glass opening 123. The glass connecting portion 128 may correspond to the other side 130b of the guide duct 130. The glass connecting portion 128 may be disposed to be parallel with a duct connecting portion 140, which will be described below. The glass connecting portion 128 may be formed in a planar shape so that adhesive strength or sealing efficiency between at least one portion thereof and the duct connecting portion 140 may be improved.

The guide duct 130 may include the duct connecting portion 140. The duct connecting portion 140 may be formed in a flange shape at the other side 130b of the guide duct 130. The duct connecting portion 140 may be configured to extend from the duct body 134. Also, at least one portion of the duct connecting portion 140 may be formed in a planar shape so that the duct connecting portion 140 may correspond to the glass connecting portion 128.

As described above, the glass connecting portion 128 and the duct connecting portion 140 are formed in a planar shape, allowing for increased adhesive strength, enhanced sealing efficiency, or increased contact area with the sealing assembly 170. However, the present disclosure is not limited thereto. The glass connecting portion 128 and the duct connecting portion 140 have a corresponding shape. For example, the glass connecting portion 128 may be formed in a curved shape, and the duct connecting portion 140 may also have a curved shape corresponding to the curved shape of the glass connecting portion 128.

The sealing assembly 170 may include a sealing cap 172 and a sealing rubber 180.

The sealing cap 172 is configured to cover a gap G formed between the guide duct 130 and the glass opening 123. Specifically, the sealing cap 172 is configured to cover the gap G (shown in FIGS. 11 and 12) formed between the duct connecting portion 140 and the glass connecting portion 128. The gap G formed by the duct connecting portion 140 and the glass connecting portion 128 may be visually identifiable, and the duct connecting portion 140 may be configured to be small and to make contact with the glass connecting portion 128. The sealing cap 172 is configured to cover the gap and hot wind or moisture may not leak from the washing space 5 to the gap G.

The sealing rubber 180 may be configured to cover the gap G (shown in FIGS. 11 and 12) formed between the guide duct 130 and the glass opening 123. Specifically, the sealing rubber 180 is configured to cover the gap G formed between the duct connecting portion 140 and the glass connecting portion 128. The sealing rubber 180 is disposed between the sealing cap 172 and the gap and may form a double sealing between the sealing cap 172 and the duct connecting portion 140 and/or between the sealing cap 172 and the glass connecting portion 128. The sealing rubber 180 includes an elastic material, and may seal between the sealing cap 172 and the gap G The material of the sealing rubber 180 is not limited, for example, may include silicone.

The sealing rubber 180 may be interposed between the sealing cap 172 and one of the guide duct 130 and the door unit 110. In the embodiment of the present disclosure, the sealing rubber 180 is interposed between the duct connecting portion 140 of the guide duct 130 and the sealing cap 172, and also interposed between the glass connecting portion 128 of the door glass 120 and the sealing cap 172.

The sealing cap 172 is configured to press the sealing rubber 180 toward the gap G The sealing cap 172 may be combined with at least one of the guide duct 130 and the door glass 120, and may be combined to press the sealing rubber 180 toward the gap G during the connection of the sealing cap 172. In the embodiment of the present disclosure, the sealing cap 172 is combined with the duct connecting portion 140 of the guide duct 130, but is not limited thereto, and may be combined with the glass connecting portion 128 of the door glass 120. When the sealing cap 172 is combined with the duct connecting portion 140, the sealing rubber 180 interposed between the gap G and the sealing cap 172 is compressed, and thus, the elastic sealing rubber 180 compresses and seals more a space between the sealing cap 172 and the gap G The sealing cap 172 and the sealing rubber 180 may have a ring shape. That is, since the gap G is formed between the other side 130b of the guide duct 130 and the glass opening 123, the sealing cap 172 and the sealing rubber 180 may be formed into the ring shape to seal the gap G.

One of the sealing cap 172 and the sealing rubber 180 includes at least one fixing groove 175 formed in a longitudinal direction thereof, and the other of the sealing cap 172 and the sealing rubber 180 includes at least one fixing protrusion 187 configured to be inserted into the fixing groove 175. In the embodiment of the present disclosure, a plurality of the fixing grooves 175 may be formed in the sealing cap 172, and a plurality of the fixing protrusions 187 corresponding to the fixing grooves 175 may be formed on the sealing rubber 180. When the fixing protrusions 187 are inserted into the fixing grooves 175, the sealing cap 172 is provisionally combined to the sealing rubber 180. Also, since the fixing protrusions 187 are configured to be spaced apart from the fixing grooves 175, the sealing cap 172 and the sealing rubber 180 are guided toward proper positions, at which the sealing cap 172 is provisionally combined with the sealing rubber 180.

The sealing cap 172 and the sealing rubber 180 are combined with the door unit 110. In the embodiment of the present disclosure, the sealing cap 172 and the sealing rubber 180 are configured to be combined with the duct connecting portion 140. The duct connecting portion 140, the sealing rubber 180, and the sealing cap 172 may be integrally connected to each other through a combination using a screw s. In the combination using the screw s, the duct connecting portion 140 includes a duct connecting hole 142, through which the screw s passes, and the sealing rubber 180 includes a rubber connecting hole 188, and the sealing cap 172 includes a sealing cap connecting hole 176. By the above-described structure, one side of each of the sealing cap 172 and the sealing rubber 180 is combined with the duct connecting portion 140, and the other side of each of the sealing cap 172 and the sealing rubber 180 covers a portion of the door glass 120 adjacent to the duct connecting portion 140. That is, the other sides of the sealing cap 172 and the sealing rubber 180 cover at least one portion of the glass connecting portion 128.

The sealing cap 172 may include a cap body 174 and at least one assembling protrusion 178. The cap body 174 is configured to form an exterior of the sealing assembly 170. Specifically, the cap body 174 forming the body of the sealing cap 172 has one side surface 174a configured to be exposed toward the washing space 5 and the other side surface 174b configured to cover the gap G with the sealing rubber 180. That is, the other side surface 174b of the cap body 174 is configured to make contact with the sealing rubber 180.

The assembling protrusion 178 is configured to protrude from the cap body 174 toward the duct connecting portion 140. In the embodiment of the present disclosure, a plurality of the assembling protrusions 178 may be formed, and may be spaced apart from each other on the cap body 174.

The duct connecting portion 140 may include at least one connecting hole 143 to receive the assembling protrusion 178 (shown in FIG. 8), and the sealing rubber 180 may include at least one rubber hole 189. The connecting hole 143 and the rubber hole 189 may correspond to the assembling protrusion 178.

In assembling the washing machine using the assembling protrusion 178, the assembling protrusion 178 is configured to maintain a proper position of the sealing cap 172 and the sealing rubber 180, with respect to the duct connecting portion 140. Also, in the operation of the washing machine, the assembling protrusion 178 maintains a mounting position of the sealing assembly 170, which prevents heat deformation of the sealing assembly 170 caused by heat of high temperature.

The sealing rubber 180 may include a rubber body 182, a first sealing portion 184, and a second sealing portion 186. The rubber body 182 may be disposed to block the gap G The first and second sealing portions 184 and 186 may be configured to extend from the rubber body 182. The first sealing portion 184 may be configured to be interposed between the duct connecting portion 140 of the guide duct 130 and the sealing cap 172. The second sealing rubber 180 may be configured to be interposed between the glass connecting portion 128 of the door glass 120 and the sealing cap 172.

The first and second sealing portions 184 and 186 may be configured to be mutually stepped with the rubber body 182 interposed therebetween. When the first and second sealing portions 184 and 186 are formed in the stepped shape, the sealing efficiency between the guide duct 130 and the door glass 120 may be improved by the sealing rubber 180.

The sealing rubber 180 may include at least one rib protrusion 190 in order that the sealing assembly 170 seals between the glass connecting portion 128 and the duct connecting portion 140. The rib protrusion 190 may be formed on a surface of the sealing rubber 180 facing the glass connecting portion 128 and the duct connecting portion 140.

The rib protrusion 190 is configured to be disposed on at least one sealing portion of the first and second sealing portions 184 and 186, and may be formed in a longitudinal direction of the sealing rubber 180. The rib protrusion 190 may be configured to form a closed loop in the longitudinal direction of the sealing rubber 180. The rib protrusion 190 may be configured to protrude from at least one sealing portion among the first and second sealing portions 184 and 186. Since the sealing rubber 180 is formed in a ring shape, the rib protrusion 190 may be formed in the ring shape along the sealing rubber 180.

The rib protrusion 190 may include a duct rib protrusion 192 formed in a longitudinal direction of the first sealing portion 184 and a unit rib protrusion 196 formed in a longitudinal direction of the second sealing portion 186.

The duct rib protrusion 192 may include a first duct rib protrusion 192a formed along the first sealing portion 184 and a second duct rub protrusion 192b formed on an outside of the first duct rib protrusion 192a in a minor axis direction. The number of the duct rib protrusion 192 is not limited. However, in the embodiment of the present disclosure, a pair of the duct rib protrusions 192 may be provided.

The first and second duct rib protrusions 192 may be provided with the rubber connecting hole 188 interposed therebetween. The rib protrusion 190 may include a connecting rib protrusion 194. The connecting rib protrusion 194 is spaced apart from the rubber connecting hole 188 by a constant distance, and is configured to pass through between the first and second duct rib protrusions 192.

The unit rib protrusion 196 may include a first unit rib protrusion 196a formed along the second sealing portion 186 and a second unit rib protrusion 196b formed on an outside of the first unit rib protrusion 196a in a minor axis direction. The number of the unit rib protrusion 196 is not limited. However, in the embodiment of the present disclosure, a pair of the unit rib protrusions 196 may be provided.

The sealing rubber 180 may include at least one auxiliary rib protrusion 198. The auxiliary rib protrusion 198 may be formed on a surface of the sealing rubber 180 facing the sealing cap 172.

The auxiliary rib protrusion 198 may be formed in a longitudinal direction of the sealing rubber 180. The auxiliary rib protrusion 198 may be configured to form a closed loop in the longitudinal direction of the sealing rubber 180. The auxiliary rib protrusion 198 may protrude from the sealing rubber 180. Since the sealing rubber 180 is formed in the ring shape, the auxiliary rib protrusion 198 may be formed in the ring shape along the sealing rubber 180.

The arrangement of the auxiliary rib protrusion 198 is not limited. In the embodiment of the present disclosure, since a portion of the sealing assembly 170, at which the first sealing portion 184 is disposed, is combined with the duct connecting portion 140, the auxiliary rib protrusion 198 is provided on the second sealing rubber 180 to increase sealing strength.

In order that the auxiliary rib protrusion 198 is alternately disposed with a pair of the unit rib protrusions 196 disposed on one side surface of the sealing rubber 180 on the basis of the second sealing portion 186, the auxiliary rib protrusion 198 may be disposed on the other side of the sealing rubber 180. In the embodiment of the present disclosure, one auxiliary rib protrusion 198 is disposed on the other side surface of the sealing rubber 180, and corresponds to a position between a pair of the unit rib protrusion 196.

FIGS. 13 and 14 are views illustrating a coupling of duct covers in the door assembly in accordance with the embodiment of the present disclosure.

The door assembly 100 may include a duct inner cover 144 and a duct outer cover 146.

The guide duct 130 may include an assembly connecting portion 138 disposed on the duct body 134 adjacent to the duct connecting portion 140, and formed in a concave shape which is further inside than an inner surface of the duct body 134.

A rear surface of a portion of the duct connecting portion 140 may be configured to be exposed toward the assembly connecting portion 138. That is, when a front surface of the duct connecting portion 140 faces the sealing assembly 170, the rear surface thereof is exposed toward the assembly connecting portion 138. Some duct connecting holes 142 among the plurality of duct connecting holes 142 provided in the duct connecting portion 140 and screws s connected to the some duct connecting holes 142 may be exposed toward the assembly connecting portion 138.

The duct inner cover 144 may be configured to cover the assembly connecting portion 138. The duct inner cover 144 may include a cover surface 144a having a shape extending from an inner surface of the duct body 134. Since the duct inner cover 144 covers the assembly connecting portion 138, the duct connecting hole 142 and the screw s may not be exposed toward the outside. Also, since the cover surface 144a is configured to have a shape extending from the inner surface of the duct body 134, the guide duct 130 may not have a stepped portion.

The duct inner cover 144 may include at least one first hooking protrusion 145 to be insertion-coupled to the duct body 134. The assembly connecting portion 138 may have at least one hooking recess to be insertion-coupled to the first hooking protrusion 145. The first hooking protrusion 145 is insertion-coupled to the first hooking recess, and thus, the duct inner cover 144 may be combined with the duct body 134.

The remaining duct connecting holes 142 among the duct connecting holes 142 and screws s connected to the remaining duct connecting holes 142 may be disposed on a side portion and/or a lower portion of the duct body 134.

The duct outer cover 146 covers the side portion and/or the lower portion of the duct body 134, and thus, the remaining duct connecting holes 142 and the screws s connected to the remaining duct connecting holes 142 disposed on the side portion and/or the lower portion of the duct body 134 are not exposed toward the outside.

The duct outer cover 146 may include at least one second hooking protrusion 147, and thus, the duct outer cover 146 may be insertion-coupled to the duct body 134. At least one second hooking recess may be formed in the side portion and/or the lower portion of the duct body 134, and thus, the second hooking protrusion 147 is insertion-coupled to the second hooking recess. Since the second hooking protrusion 147 is insertion-coupled to the second hooking recess, the duct outer cover 146 may be combined with the duct body 134.

The foregoing is illustrative of the specific embodiments. However, the above-described embodiments are not to be construed as limiting thereof. It is to be understood that the foregoing is illustrative of various embodiments and is not to be construed as limited to the specific embodiments disclosed, and that modifications to the disclosed embodiments, as well as other embodiments, are intended to be included within the scope of the appended claims.

The invention claimed is:

1. A washing machine comprising:
   a cabinet having a first opening and a washing space therein; and
   a door assembly configured to open or close the first opening,
   wherein the door assembly includes:
      a door unit configured to be rotatable with respect to the cabinet including:
         a door body corresponding to the first opening and including a second opening,
         a door glass including a glass opening forming a glass hole, and
         a guide duct having a first side corresponding to the glass opening in the door glass and a second side corresponding to the second opening in the door body,
      a sub-door configured to open or close the second opening; and
      a sealing assembly configured to seal the first side of the guide duct and the glass opening in the door glass, wherein the sealing assembly comprises:
         a sealing rubber configured to cover a gap formed between the guide duct and the glass opening in the door glass,
         a sealing cap including a sealing cap connecting hole, and configured to cover the sealing rubber and coupled to at least one of the guide duct and the door glass, and
         a coupling member configured to couple the sealing rubber and the sealing cap through the sealing cap connecting hole.

2. The washing machine of claim 1, wherein:
the sealing rubber includes a rubber connecting hole into which the coupling member is inserted.

3. The washing machine of claim 2, wherein:
the guide duct includes a duct connecting portion formed in a flange shape on the first side of the guide duct; and
the door glass includes a glass connecting portion disposed adjacent to the glass opening and formed to correspond to the duct connecting portion, and
the duct connecting portion includes a duct connecting hole through which the coupling member passes.

4. The washing machine of claim 3, wherein:
the coupling member includes a screw, and
at least one portion of each of the glass connecting portion and the duct connecting portion is formed in a planar shape.

5. The washing machine of claim 3, wherein:
the sealing cap includes an assembling protrusion configured to protrude toward the duct connecting portion, and
the duct connecting portion includes a connecting hole to receive the assembling protrusion.

6. The washing machine of claim 3, wherein the glass connecting portion faces and is parallel to the duct connecting portion.

7. The washing machine of claim 6, wherein the sealing cap is configured to press the sealing rubber toward the gap.

8. The washing machine of claim 6, wherein the sealing cap comprises a first side surface exposed to the washing space and a second side surface configured to cover the gap with the sealing rubber.

9. The washing machine of claim 6, wherein:
the sealing cap and the sealing rubber each include a side combined with the duct connecting portion and another side configured to cover a portion of the door glass adjacent to the duct connecting portion.

10. The washing machine of claim 1, wherein:
one of the sealing cap and the sealing rubber has at least one fixing groove formed in a longitudinal direction thereof; and another of the sealing cap and the sealing rubber has at least one fixing protrusion configured to be inserted into and provisionally combined with the at least one fixing groove.

11. The washing machine of claim 3, wherein the sealing cap and the sealing rubber are provided in a ring shape.

12. The washing machine of claim 1, wherein:
the guide duct comprises a duct connecting portion formed in a flange shape on the first side of the guide duct; the door glass comprises a glass connecting portion provided adjacent to the glass opening and corresponding to the duct connecting portion; and
the sealing rubber comprises:
a rubber body;
a first sealing portion extending from the rubber body toward a space between the duct connecting portion and the sealing cap; and
a second sealing portion extending from the rubber body toward a space between the glass connecting portion and the sealing cap.

13. The washing machine of claim 12, wherein the first and second sealing portions are configured to be mutually stepped with the rubber body interposed therebetween.

14. The washing machine of claim 12, wherein the sealing rubber comprises at least one rib protrusion formed on at least one sealing portion of the first and second sealing portions in a longitudinal direction of the sealing rubber and configured to face the duct connecting portion or the glass connecting portion.

15. The washing machine of claim 14, wherein the rib protrusion is formed in a closed loop shape in the longitudinal direction of the sealing rubber.

16. The washing machine of claim 12, wherein the first sealing portion includes a rubber connecting hole into which the coupling member is inserted.

17. The washing machine of claim 16, wherein the first sealing portion includes:
a first duct rib protrusion extending towards the guide duct on an inner circumference of the first sealing portion; and
a second duct rib protrusion extending towards the guide duct on an outer circumference of the first sealing portion.

18. The washing machine of claim 17, wherein the first sealing portion further comprises a connecting rib protrusion spaced apart from the rubber connecting hole and extending towards the guide duct from the first duct rib protrusion to the second duct rib protrusion.

* * * * *